(12) United States Patent
Davis et al.

(10) Patent No.: US 6,953,320 B1
(45) Date of Patent: *Oct. 11, 2005

(54) VENTILATION FAN

(75) Inventors: James R. Davis, Haslett, MI (US); Daniel G. Hansen, Holt, MI (US)

(73) Assignee: Munters Corporation, Amesbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/657,620

(22) Filed: Sep. 8, 2003

Related U.S. Application Data

(63) Continuation of application No. 10/144,076, filed on May 13, 2002, now Pat. No. 6,616,404, which is a continuation of application No. 09/753,405, filed on Jan. 3, 2001, now Pat. No. 6,386,828.

(60) Provisional application No. 60/174,221, filed on Jan. 3, 2000.

(51) Int. Cl.[7] .............................................. F24F 7/013
(52) U.S. Cl. .................. 415/147; 416/223 R; 416/228; 454/259; 454/353
(58) Field of Search ................................ 415/146, 147, 415/221, 914; 454/184, 353, 259; 416/223 R, 416/228, 237; 137/512.1

(56) References Cited

U.S. PATENT DOCUMENTS

| | | | |
|---|---|---|---|
| 1,706,280 A | 3/1929 | Dyer | |
| 1,706,608 A * | 3/1929 | Holmes | |
| 2,339,363 A * | 1/1944 | Sutcliffe et al. | |
| 2,594,944 A | 4/1952 | Lohman, Jr. | |
| 3,012,495 A * | 12/1961 | Miller | 454/344 |
| 3,072,041 A * | 1/1963 | Downing | 454/200 |
| 3,169,694 A | 2/1965 | Borchers | |
| 3,335,654 A | 8/1967 | Killam | |
| 3,350,996 A | 11/1967 | Rose | |
| 3,447,741 A | 6/1969 | Havette et al. | |
| 3,472,150 A * | 10/1969 | Strawsine | 454/353 |
| 3,826,179 A | 7/1974 | Alley | |
| 3,960,464 A * | 6/1976 | Downing | 415/146 |
| 4,202,655 A * | 5/1980 | Maloof | 416/157 R |
| 4,263,842 A | 4/1981 | Moore | |
| 4,411,598 A | 10/1983 | Okada | |
| 4,445,426 A * | 5/1984 | Bohanon | 454/351 |
| 5,215,438 A | 6/1993 | Chou et al. | |
| 5,547,339 A | 8/1996 | Burgers | |
| 5,890,959 A * | 4/1999 | Pettit et al. | 137/849 |
| 6,164,911 A * | 12/2000 | LeBlanc et al. | 415/228 |
| 6,190,122 B1 * | 2/2001 | McCabe | 415/146 |

FOREIGN PATENT DOCUMENTS

| | | | | |
|---|---|---|---|---|
| DE | 3425502 A | * | 1/1986 | F04D 29/30 |
| JP | 08121386 A | * | 5/1996 | F04D 29/30 |
| JP | 09004585 A | * | 1/1997 | F04D 7/04 |

* cited by examiner

*Primary Examiner*—Harold Joyce
(74) *Attorney, Agent, or Firm*—Mary M. Moyne; Ian C. McLeod

(57) ABSTRACT

A ventilation fan assembly (10) having a fan (22) mounted in a housing (12) and a shutter assembly (60). The housing has a square inlet portion (12C), a circular center portion (12E) and a conical outlet portion (12D) having rifling grooves (20). The shoulder (16) formed between the inlet portion and the center portion is radiused to reduce disruption of air flowing from the inlet portion to the center portion. The shape of the blades (32) of the propeller (28) is such that the axial velocity produced as the propeller rotates is essentially constant along the length of the blades. The shutter assembly has a large, radiused entrance and airfoil shaped blades which reduce air disruption. The blades have a flexible flap (68) along the trailing edges (64D) which form a seal between adjacent blades to prevent air from leaking from the housing through the shutter assembly.

21 Claims, 6 Drawing Sheets

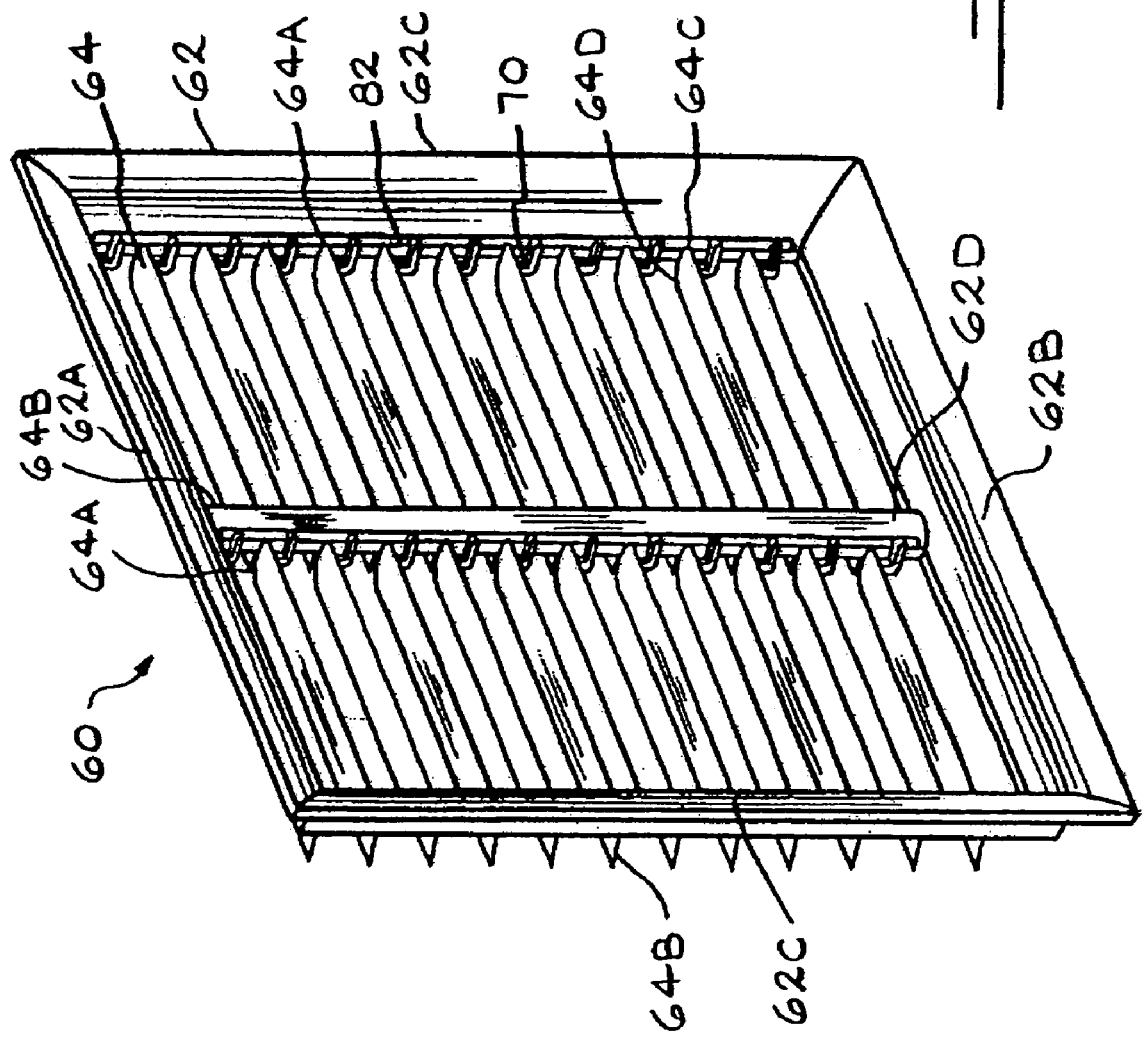

VENTILATION FAN

CROSS-REFERENCES TO RELATED APPLICATIONS

This is a continuation application and the assignment document for the parent application Ser. No. 09/753,405 was filed on Jan. 3, 2001, now U.S. Pat. No. 6,386,828, which is a continuation of Ser. No. 10/144,076, filed May 13, 2002, now U.S. Pat. No. 6,616,404.

This application claims the benefit of U.S. Provisional Application Ser. No. 60/174,221 filed Jan. 3, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION (1) Field of the Invention

The present invention relates to a ventilation fan for use in a building; particularly, factories and agricultural buildings. In particular, the present invention relates to a ventilation fan having a backdraft assembly and providing minimal airflow resistance and increased efficiency.

(2) Description of the Related Art

The related art has shown various types of propeller blades. Illustrative are U.S. Pat. No. 3,169,694 to Borchers; U.S. Pat. No. 3,447,741 to Havette et al and U.S. Pat. No. 4,411,598 to Okada.

Borchers describes a propeller used for the movement of fluids such as in an axial flow fan. The propeller blade is shaped and positioned such that when the fan is running at a definite speed, the created vortex is projected with a centrifugal force at its periphery approximately equal to the static force of the ambient air.

Havette et al describes a faired propeller having a diffuser.

Okada relates to the vane structure of the fan, wheel rotor of a fluid propeller fan which provides a compromise between an axial flow fan and a centrifugal fan. The fan wheel assembly includes a wheel hub having a plurality of vanes extending radially from the wheel hub with each vane having a pitch angle which gradually decreases toward the wheel hub. The pitch angles of each of the vanes are selected so that radially inner portions of the individual vanes are capable of providing drought flow characteristics of axial flow fans while radially outer portions of the vanes are capable of providing drought flow characteristics of centrifugal fans.

The related art has also shown various types of automatic shutter assemblies having a frame with shutter members pivotably mounted across the frame. Illustrative are U.S. Pat. No. 1,706,280 to Dyer; U.S. Pat. No. 2,594,944 to Lohman, Jr.; U.S. Pat. No. 3,350,996 to Rose; U.S. Pat. No. 3,826,179 to Alley and U.S. Pat. No. 4,263,842 to Moore.

In the Dyer reference, the shutter members are formed of rectangular sheet metal plates. The shutter members are provided with a weighted member disposed relative to the pivotal axis so that while the shutter members are in the closed position, the center of gravity of each of the shutter members is located outwardly beyond the pivotal axis thereof, with the result that the shutter members have a tendency to swing on their pivots in a direction to cause an inward movement of their lower edges. Thus, the lower edges of the shutter members are firmly pressed inwardly against the faces of the adjacent shutter members. When, however, the fan is started and the air currents impinge upon the rear faces of the shutter members causing the shutter members to swing outwardly upon their pivots to a substantially horizontal position. The resistance of the shutter members to the air pressure during this movement is gradually decreased because of the fact that the center of gravity of each of the weighted shutter members moves gradually toward the vertical plane of its pivotal axis. When the shutter members are in their wide open positions, there is only a slight tendency of the shutter members to close, and very little air pressure is required to keep the shutter members in their wide open positions.

In the Lohman reference, the hinge ears of the carrier brackets for the shutter members counterbalances the major part of the weight of the forwardly extending free end portions of the shutter members and their interconnecting lever arms and tie bar. The counterbalance is calculated so that the shutter members will tend to move to the closed position under gravity yet will open quickly and easily when airflow pressure is directed against their inner faces. The shutter is also provided with a spring member to prevent the shutter members from remaining in the open position.

In the Rose reference, the shutter members are inverted, V-shaped members with inwardly directed arms preferably secured to each end of each blade and are pivotably connected to the sides of the frame by pivot members. A control member is connected to the arms and allows for manually adjusting the shutter members.

Alley and Moore show backdraft assemblies having airfoil shaped shutter members.

Of some interest is U.S. Pat. No. 3,072,041 to Downing which shows a shutter device having shutter plates located between the housing of the motor and the outer ring.

Also of interest are U.S. Pat. No. 3,335,654 to Killam; U.S. Pat. No. 5,215,438 to Chou et al and U.S. Pat. No. 5,547,339 to Burgers.

Killam shows a ventilating apparatus having an inlet for moving air into the centrifugal blower wheel. When the blower wheel is motionless, the outlet is closed by a flat swingable damper vane. The damper vane prevents outside drafts from traveling back through the wheel into the building.

Chou et al describes a self-centered orifice housing for an axial flow fan. The housing includes fan motor supports that also function collectively as a fan stator. The construction of the housing is such that assembling the motor into the housing results in the motor shaft being precisely located at the center of the housing orifice, so that there is a very small clearance between the orifice wall and blade tips of the fan. The inlet of the orifice is elliptical in cross-section. This configuration promotes attached flow in the air entering the orifice contributing to reduced noise generation and increased efficiency in the fan and orifice system.

Burgers describes a turbulator for a fluid impelling device such as an axial or centrifugal fan. The turbulator has a triangular cross-section and prevents flow separation as the fluid flow enters the inlet passage to decrease the acoustic level.

There remains the need for a ventilation fan having a square inlet which does not disrupt airflow into the fan and having a propeller which produces airflow having a constant velocity along the length of the blades to produce better airflow and also having an automatic backdraft assembly which is easily installed and removed.

SUMMARY OF THE INVENTION

The present invention relates to a ventilation fan assembly having an axial propeller fan mounted in a housing. The housing has a square inlet portion, a circular center portion and a conical shaped outlet portion. The shoulder formed in the inner cavity of the housing between the square inlet portion and the circular center portion is radiused to reduce disruption of air flowing from the inlet portion to the center portion. The fan is mounted by a bracket in the inner cavity of the housing. The bracket on which the fan is mounted has two (2) arms which have angled end sections and straight or vertical center portions. When the bracket is correctly positioned in the housing, the center portions are parallel to each other and perpendicular to the bottom wall of the inlet portion of the housing. The end portions are angled such that the planes formed by the angled end portions extend through and intersect at the center axis of the center portion of the housing. The shape and positioning of the bracket correctly positions the fan such that the propeller of the fan is completely within the circular center portion of the housing and spaced apart from the inlet of the housing. The positioning of the bracket and fan produces minimal disruption of air moving into the center portion. The inner diameter of the center portion is only slightly greater than the diameter of the path of the propeller which increases the efficiency of the fan. The fan of the present invention is approximately 20% more efficient and provides approximately 20% more airflow. The blades of the propeller have an airfoil shape and also include a rounded protrusion on the trailing edge adjacent the center hub of the propeller. The shape of the blades is such that the axial velocity produced by the propeller as the propeller rotates is essentially constant along the length of the blades. The inlet of the housing is provided with an automatic shutter assembly. The outer side of the frame of the shutter assembly is radiused to reduce the disruption of the air entering the inlet of the housing. Toggle latches securely hold the shutter assembly in place while allowing the shutter assembly to be quickly and easily removed. The shutter blades of the shutter assembly have an airfoil shape to allow for quicker and easier opening of the shutter assembly with less airflow resistance.

The present invention relates to a fan assembly for use in ventilation of a building, which comprises: a housing having an outlet with a conical shape and an inlet with an inner cavity extending between the inlet and the outlet, the inner cavity having a center portion with a circular cross-section; a bracket mounted in the inner cavity of the housing spaced between the inlet and the center portion; and a fan mounted on the bracket and having a motor connected to a shaft with a propeller mounted on one end of the shaft, the fan being mounted on the bracket such that the propeller is spaced apart from the inlet and the outlet of the housing, the propeller having blades, each blade having a shape such that when the propeller is rotating, an axial velocity of air coming off the propeller is essentially constant along most of a length of the blades from a tip of the blades toward the shaft wherein the blades of the propeller are located in the center portion of the inner cavity spaced apart from the inlet of the housing.

Further, the present invention relates to a fan assembly for use in a building for ventilation, which comprises: a housing having an outlet with a conical shape and an inlet having a square cross-section with an inner cavity extending between the inlet and the outlet, the inner cavity having a center portion with a circular cross-section; a fan mounted in the housing between the inlet and the outlet and having a motor connected to a shaft with a propeller mounted on one end of the shaft, the propeller having blades wherein the fan is mounted in the housing such that the propeller is spaced apart from the inlet and the outlet of the housing; and a backdraft assembly mounted on the inlet of the housing and having a frame with shutter blades pivotably mounted on the frame and extending horizontally across the inlet of the housing wherein the shutter blades have an airfoil shape with a front edge and a rear edge and are mounted at the front edge to the frame wherein a flexible flap is mounted on the rear edge wherein when the shutter blades are in a closed position, the flexible flap allows for sealing of the shutter blades to prevent air in the inner cavity of the housing from moving out of the housing through the inlet and the backdraft assembly.

The substance and advantages of the present invention will become increasingly apparent by reference to the following drawings and the description.

BRIEF DESCRIPTION OF THE DRAWINGS

FIG. 7 is a perspective view of the shutter assembly 60 with the shutter blades 64 in the open position.

DESCRIPTION OF THE PREFERRED EMBODIMENTS

Figure 1:
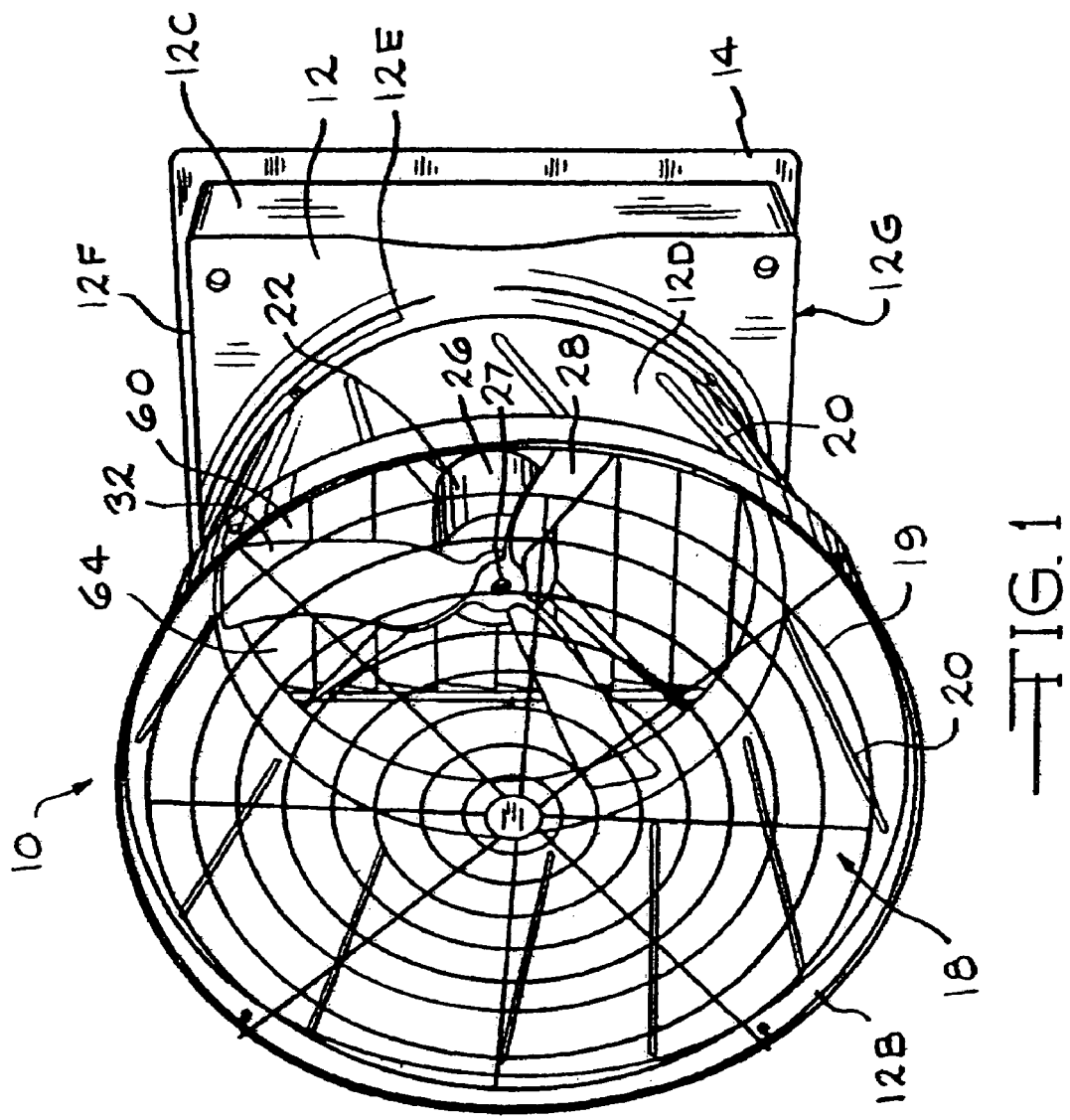
FIG. 1 is a perspective view of the fan assembly 10 of the present invention having a direct drive.

FIG. 1 shows the ventilation fan assembly 10 of the present invention. The fan assembly 10 is intended to be installed in buildings such as factories or agricultural buildings and can be constructed in a variety of sizes. The fan assembly 10 includes a housing 12, a fan 22 and a backdraft assembly 60. The housing 12 has an inlet 12A and an outlet 12B with an inlet portion 12C adjacent the inlet 12A and an outlet portion 12D adjacent the outlet 12B. A center portion 12E is spaced between the inlet portion 12C and the outlet portion 12D. The inlet 12A of the housing 12 is provided with a mounting flange 14 to allow for securing the fan assembly 10 in the building. In the preferred embodiment, the inlet portion 12C of the housing 12 has a square cross-section. The square shape of the inlet portion 12C of the housing 12 allows for easier installation of the fan assembly 10 in a building. The vertical sidewalls of the inlet portion 12C of the housing 12 are each provided with a rounded protrusion spaced between the top wall 12F and bottom wall 12G of the inlet portion 12C of the housing 12 (FIG. 1). The protrusion extends outward toward the center portion 12E. The center portion 12D of the housing 12 preferably has a circular cross-section. A shoulder 16 is formed in the inner cavity 18 of the housing 12 between the inlet portion 12C and the center portion 12E. The shoulder 16 is preferably radiused or rounded to reduce the disruption of air moving from the inlet portion 12C to the center portion 12E. The radiused shoulder 16 in the inner cavity 18 helps to smooth the transition of air from the square inlet portion 12C to the circular center portion 12E. In the preferred embodiment, the cross-sectional size of the inlet portion 12C is greater than the cross-sectional size of the center portion 12E. The center portion 12E of the housing 12 preferably has a constant inner diameter along its length. The outlet portion 12D of the housing 12 extends outward from the center portion 12E and is preferably formed by a discharge cone. The discharge cone has a conical shape and increases in diameter as the discharge cone extends away from the center portion 12E. The discharge cone extends outward at an angle of about 9° from the horizontal. The outlet portion 12D of the discharge cone opposite the center portion 12E is preferably provided with a screen or grate 19 to prevent foreign objects from entering the outlet 12B of the housing 12 and damaging the fan 22 (FIG. 1). The sidewall of the discharge cone is preferably provided with rifling grooves 20 on the inner side adjacent the inner cavity 18. The rifling grooves 20 extend outward at an angle, diagonally from the center portion 12E to the outlet 12B of the housing 12 in a clockwise direction. The rifling grooves 20 are preferably evenly spaced around the sidewall of the discharge cone. It is believed that the rifling grooves 20 assist in the flow of air from the propeller 28 to the outlet 12B of the housing 12. The discharge cone is preferably removable from the remainder of the housing 12. This allows for easier shipping and storage of the fan assembly 10. However, the housing 12 could be constructed as a single piece. In the preferred embodiment, the housing 12 is constructed of fiberglass.

Figure 2:
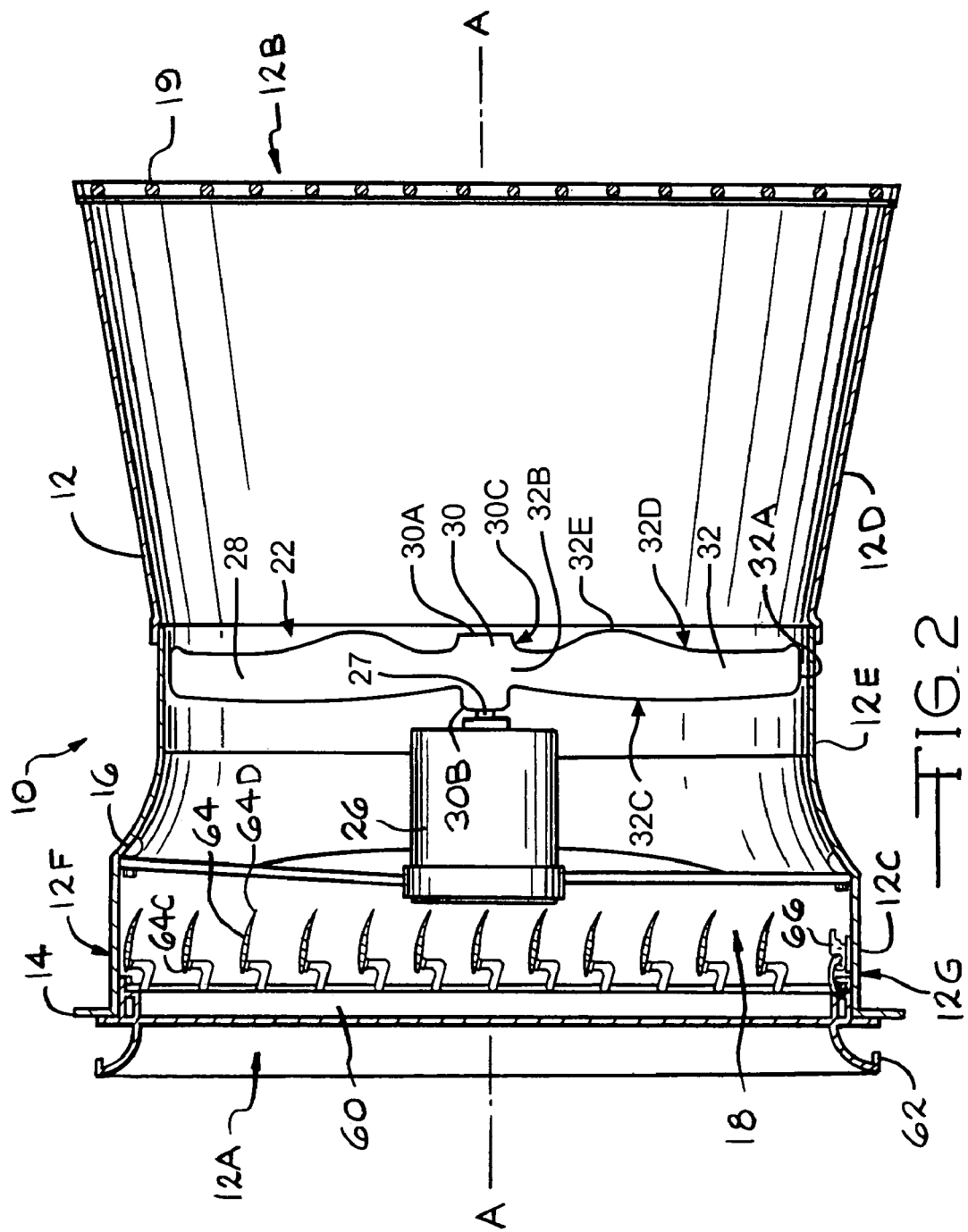
FIG. 2 is a cross-sectional view of the fan assembly 10 having a direct drive showing the shutter blades 64 of the shutter assembly 60 in the open position.

The fan 22 is preferably an axial propeller fan which includes a motor 26 and a propeller 28 having blades 32. The fan 22 is mounted on a support or bracket 34 in the inner cavity 18 of the housing 12. In the preferred embodiment, the propeller 28 includes a center hub 30 and three (3) blades 32. The center hub 30 has a first end 30A and a second end 30B with a sidewall 30C extending between the ends 30A and 30B. The center hub 30 is mounted on the shaft 50 such that the first end 30A is facing or adjacent to the outlet 12B of the housing 12. The blades 32 have opposed ends 32A and 32B with a leading edge 32C and a trailing edge 32D extending therebetween. The blades 32 are mounted at one (1) end 32B to the center hub 30 such that the leading edge 32C of the blade 32 is adjacent the second end 30B of the center hub 30 and the trailing edge 32D of the blade 32 is adjacent the first end 30A of the center hub 30 (FIG. 2). The ends 32B of the blades 32 are mounted on the center hub 30 at a clockwise angle from the trailing edge 32D to the leading edge 32C when viewed from the second end 30B of the center hub 30. The end or tip 32A of the blades 32 preferably have a swept back or machete-like tip on the trailing edge 32D. The trailing edge 32D of the blades 32 also preferably has a rounded protrusion 32E adjacent the center hub 30. The blades 32 preferably have an airfoil shape such that the thickness of the blades 32 vary smoothly from the leading edge 32C to the trailing edge 32D. The width of the blades 32 also preferably vary along the length of the blades 32 such that the width of the blades 32 between the edges 32C and 32D adjacent the center hub 30 is less than a width of the blades 32 between the edges 32C and 32D adjacent the tip 32A of the blade 32. The airfoil shape of the blades 32 and the protrusion 32E are such that when the propeller 28 is rotating, the axial velocity of air coming off of the propeller 28 is essentially constant along most of the length of the blades 32.

Figure 3:
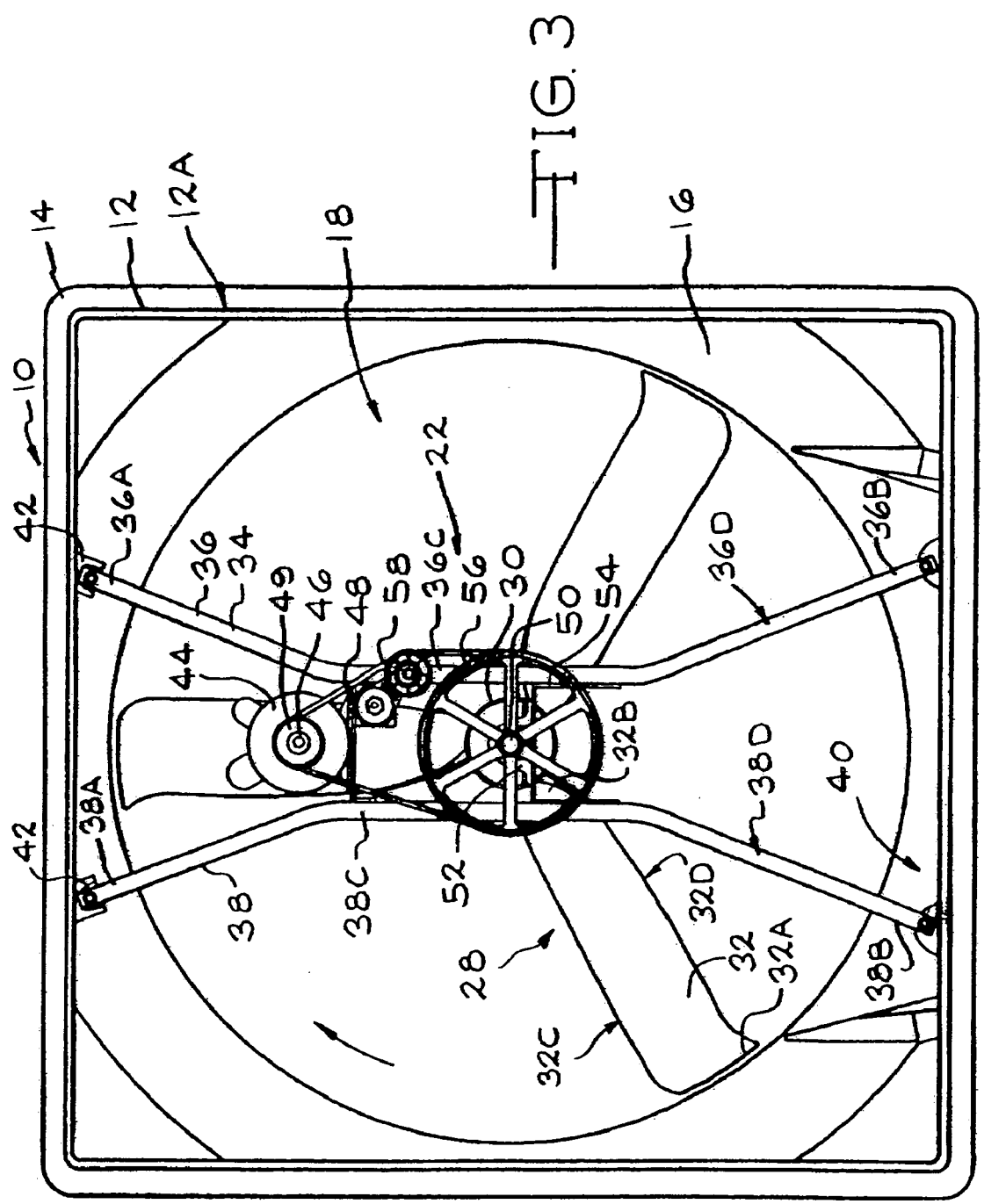
FIG. 3 is a rear view of the fan assembly 10 having a belt drive system without the shutter assembly 60 showing the motor 44 mounted on the bracket 34.

The bracket or support 34 for the fan 22 preferably includes a pair of struts or arms 36 and 38 which extend from the top wall 12F of the inlet portion 12C of the housing 12 to the bottom wall 12G of the inlet portion 12C of the housing 12 (FIG. 3). Each of the arms 36 and 38 preferably includes spaced apart angled top and bottom end sections 36A, 36B, 38A and 38B with straight center sections 36C and 38C spaced between the ends sections 36A, 36B, 38A and 38B. When the bracket 34 is correctly mounted in the inner cavity 18 of the housing 12, the center sections 36C and 38C of the arms 36 and 38 are parallel and spaced apart and perpendicular to the top and bottom walls 12F and 12G of the inlet portion 12C of the housing 12. The top and bottom walls 12F and 12G of the inlet portion 12C of the housing 12 adjacent the center portion 12E at the shoulder 16 are provided with indentions 40 and 42 which allow for accurately mounting the bracket 34 for the fan 22. In the preferred embodiment, the shoulder 16 of the housing 12 adjacent the bottom wall 12G of the inlet portion 12C is provided with an indention 40 extending outward toward the center portion 12E. The bottom end section 36B and 38B of the arms 36 and 38 are mounted in the indention 40. Preferably, the shoulder 16 adjacent the top wall 12F of the inlet portion 12C is provided with a pair of spaced apart indentions 42 which accommodate the top end sections 36A and 38A of the arms 36 and 38. The indentions 40 and 42 in the shoulder 16 enable the fan 22 to be positioned further into the center portion 12E away from the inlet 12A of the housing 12. The mounting of the arms 36 and 38 partially into the shoulder 16 also reduces the disruptive effect of the arms 36 and 38 on the air moving from the inlet 12A to the fan 22. The front edges 36D and 38D of the arms 36 and 38 facing or adjacent to the inlet 12A of the housing 12 are preferably radiused and smooth such as to reduce the disruption of air moving into the center portion 12E from the inlet 12A. The end sections 36A, 36B, 38A and 38B are angled with respect to the center sections 36C and 38C such that when the arms 36 and 38 are correctly positioned in the inlet portion 12C of the inner cavity 18 of the housing 12, the planes formed by the arms 36 and 38 extend through and intersect at the center axis A—A of the center portion 12E of the housing 12 (FIG. 2). The angling of the arms 36 and 38 allows for minimal pressure drop through the housing 12. The shape of the arms 36 and 38 allows for easily positioning of the fan 22 such that the shaft 50 of the fan 22 is co-axial with the center axis A—A of the center portion 12E of the housing 12. The arms 36 and 38 of the bracket 34 are preferably constructed of hollow rectangular tubing made of a durable, lightweight material such as aluminum. Although the above bracket 34 is preferred and increases the efficiency of the fan assembly 10, the fan 22 may be mounted in the inner cavity 18 of the housing 12 by any well known means.

The fan 22 can be operated by direct drive, by a pulley or belt drive system or by any other well known means. For the direct drive, the motor 26 is mounted on a support plate (not shown) which extends between the center sections 36C and 38C of the arms 36 and 38 of the bracket 34 (FIG. 2). The propeller 28 of the fan 22 is mounted directly on the motor shaft 27 of the motor 26. The motor 26 is mounted such that the axis of the motor shaft 27 and thus, the axis of the propeller 28 are co-axial with the center axis A—A of the center portion 12E of the housing 12. In an embodiment using a pulley system, the motor 44 is mounted on a top support plate 48 with the motor shaft 46 extending inward toward the inlet 12A of the housing 12 (FIG. 3). A motor pulley 49 is mounted on the end of the motor shaft 46. The propeller 28 is mounted on a shaft 50 which is rotatably mounted by a pillow block bearing 52 on a lower support plate 54 extending between the center sections 36C and 38C of the arms 36 and 38 of the bracket 34. The lower support plate 54 is positioned such that the axis of the shaft 50 and thus, the axis of the propeller 28 is co-axial with the center axis A—A of the center portion 12E of the housing 12. The end of the shaft 50 opposite the propeller 28 is provided with a propeller sheave or pulley 56 which is connected by a belt to the motor pulley 49. A belt tensioner 58 can also be provided.

The fan 22 is mounted on the bracket 34 such that the motor 26 or 44 of the fan 22 is in the inlet portion 12C of the housing 12 and the propeller 28 of the fan 22 is in the center portion 12E of the housing 12 adjacent the outlet portion 12D of the housing 12. In the preferred embodiment, the fan 22 is positioned and the center portion 12E is of such a size that, the propeller 28 is completely within the center portion 12E. The inner diameter of the center portion 12E of the housing 12 is preferably only slightly greater than the diameter of the propeller 28 of the fan 22 which is equal to the diameter of the path of the propeller 28. In the preferred embodiment, the outer ends or tips 32A of the blades 32 of the propeller 28 of the fan 22 are spaced only about 0.4% to 0.8% of the propeller diameter from the center portion 12E of the housing 12. The minimal spacing between the outer ends 32A of the blades 32 of the propeller 28 and the housing 12 increases the efficiency of the fan assembly 10 and is important for the increased performance of the fan 22. The length of the inlet portion 12C of the housing 12 and the positioning of the fan 22 in the center portion 12E ensures that the propeller 28 is at a maximum distance from the inlet 12A as allowed by the housing 12. The inlet portion 12C of the housing 12 is of greater length than standard housing for fan assemblies such that the propeller 28 of the fan 22 is located a greater distance from the inlet 12A of the housing 12. The spacing of propeller 28 from the inlet 12A of the housing 12 smooths the transition of air from the inlet 12A into the propeller 28 thus, allowing for greater efficiency of the fan 22 due to less air disruption.

Figure 6:
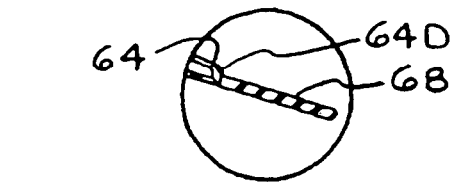
FIG. 6 is a partial enlarged view of the edge of the shutter blades 64 showing the flexible flap 68.
Figure 4:
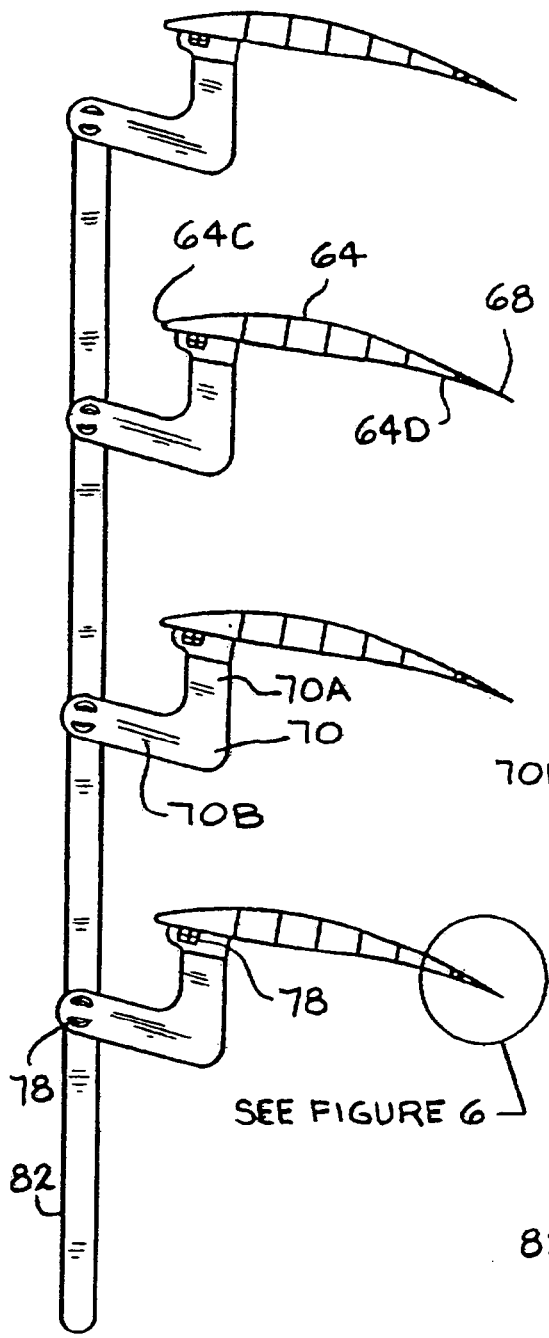
FIG. 4 is a partial cross-sectional view of the shutter blades 64 in the open position.
Figure 5:
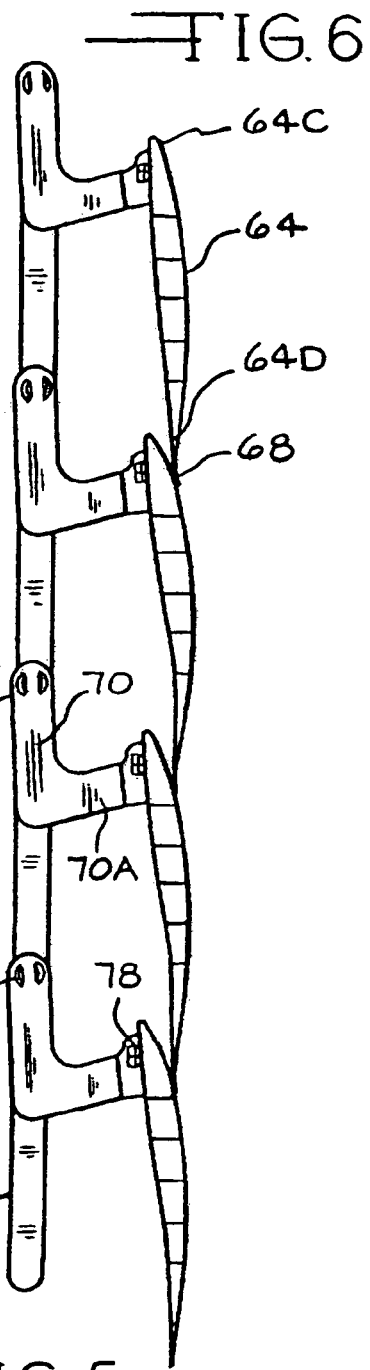
FIG. 5 is a partial cross-sectional view of the shutter blades 64 of the shutter assembly 60 in the closed position.
Figure 8:
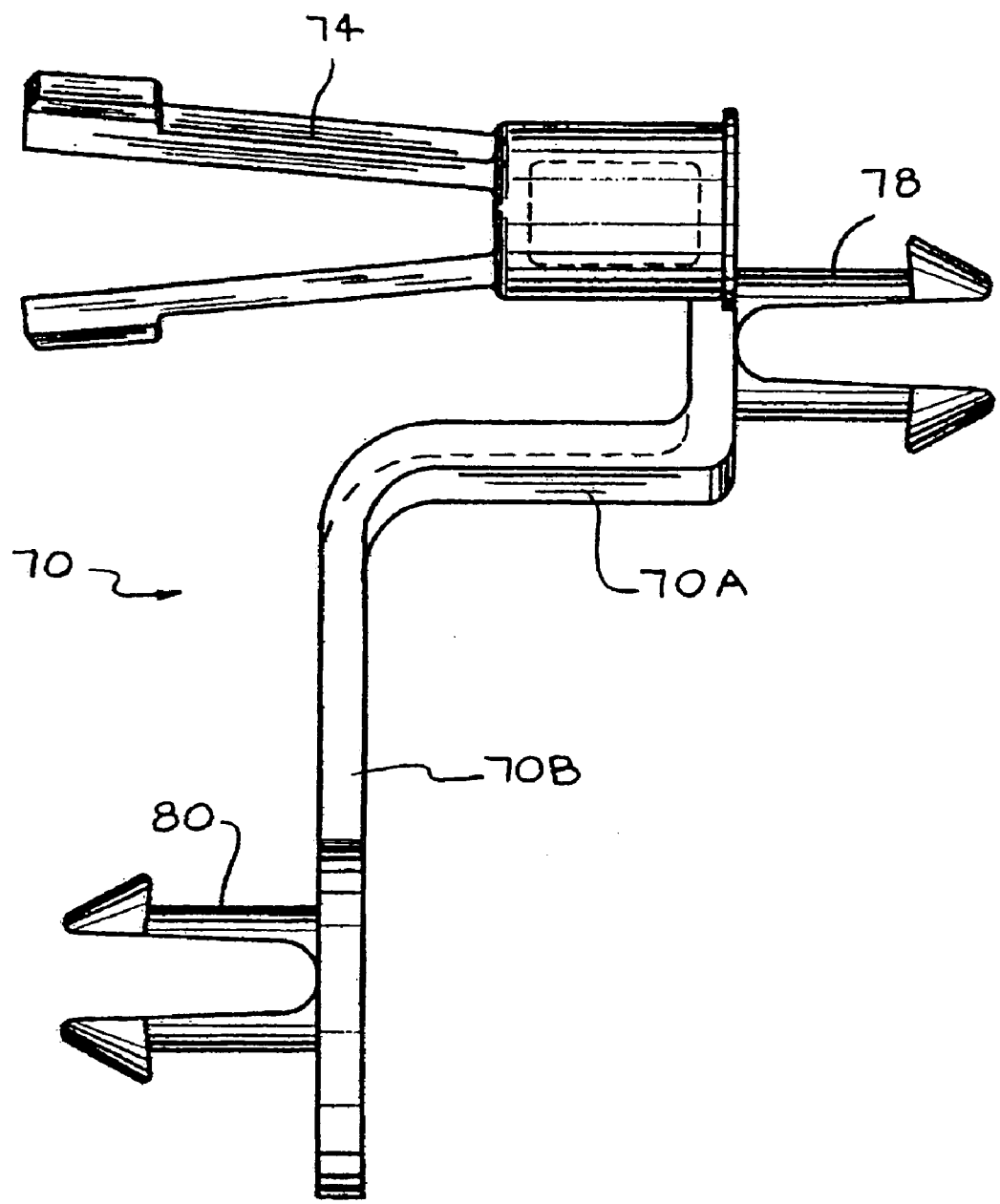
FIG. 8 is a side view of the first end piece 70 showing the connector 74, the pivot pin 78 and the tie bar pin 80.

A backdraft damper or shutter assembly 60 is removably mounted on the inlet 12A of the housing 12. The shutter assembly 60 opens automatically as the propeller 28 rotates and draws air into the inner cavity 18 of the housing 12. When the fan 22 is not operating, the shutter assembly 60 is in the closed position and prevents air from moving from the building through the housing 12 of the fan assembly 10. The backdraft assembly 60 includes a frame 62 and shutter blades or louvers 64 pivotably mounted to the frame 62. The frame 62 has top and bottom rails 62A and 62B with side rails 62C extending between the top and bottom rails 62A and 62B. Optionally, a center rail 62D can be provided spaced between the side rails 62C and extending from the top rail 62A to the bottom rail 62B (FIG. 7). The center rail 62D is used for larger air shutter assemblies 60 to prevent bending and flexing of the blades 32. The rails 62A, 62B and 62C of the frame 62 have radiused edges on the entrance side opposite the fan 22. The large radiused edges minimize the disruption of air as it moves into the inner cavity 18 of the housing 12 (FIG. 7) which is important for the efficiency of the fan assembly 10. In the preferred embodiment, the radiused outer surface or entrance side of the rails 62A, 62B and 62C of the frame 62 extend outward beyond the perimeter of the inlet 12A of the housing 12 (FIG. 2). In the preferred embodiment, the radiused edges of the rails 62A, 62B and 62C are formed by an arc of a circle having a 2 inch (5.0 cm) radius. The center rail 62D, if provided, is also radiused on its outer surface. The backdraft assembly 60 is removably mounted by toggle latches 66 which are mounted along the bottom rail 62B of the frame 62 of the backdraft assembly 60. The latches of the toggle latches 66 are mounted on the bottom wall 12G of the inlet portion 12C of the housing 12 and engage a strike on the bottom rail 62B of the frame 62 of the shutter assembly 60. The top wall 12F of the inlet portion 12C of the housing 12 is provided with an overhang (not shown) which holds the top of the backdraft assembly 60 in place. The shutter blades 64 have opposed ends 64A and 64B with a leading edge 64C and a trailing edge 64D extending therebetween. The shutter blades 64 are pivotably mounted at each end 64A and 64B at their leading edge 64C to the frame 62. The shutter assembly 60 can have any number of groups of shutter blades 64. In the embodiment shown, there are two (2) groups of horizontal shutter blades 64 divided vertically. Thus, each shutter blade 64 extends only half the width of the inlet 12A of the housing 12. A set of shutter blades 64 is mounted between each of the side rails 62C and center rail 62D of the frame 62 in a horizontal direction (FIG. 7). The shutter blades 64 are spaced apart such that in the closed position, the trailing edge 64D of an upper shutter blade 64 overlaps the leading edge 64C of the next lower shutter blade 64. The shutter blades 64 are preferably provided with a soft, flexible flap 68 along the trailing edge 64D (FIG. 6). The flexible flap 68 forms a seal between adjacent shutter blades 64 when the blades 64 are in the closed position which prevents air from leaking from the inner cavity 18 of the housing 12. The shutter blades 64 are pivotably mounted to the frame 62 by end pieces 70 (one shown). Each shutter blade 64 is provided with a first end piece 70 and a second end piece (not shown). The end pieces 70 slide into each end of each of the hollow blades 64. The first end piece 70 is essentially L-shaped with a first leg 70A and a second leg 70B (FIG. 8). The first leg 70A contains a connector 74 and a pivot pin 78 at the first end 70 opposite the second leg 70B. The connector 74 extends outward from the first leg 70A including two (2) flexible arms which snap into two (2) openings in each end of the shutter blade 64 and are held in place by the spring action of the flexible arms. The connector 74 allows for attaching the first end piece 70 to the end 64A of the shutter blade 64. The pivot pin 78 extends outward from the first leg 70A in a direction opposite the connector 74. The pivot pin 78 extends and snaps into a round bearing hole in the frame 62 of the shutter assembly 60 and pivotably mounts the shutter blade 64 to the frame 62. The second leg 70B contains a tie bar pin 80 at the second end opposite the first leg 70A. The tie bar pin 80 extends outward in a direction similar to the connector 74. The first leg 70A at the first end of the first end piece 70 has a bend and extends outward in a direction opposite the tie bar pin 80. This allows the tie bar 82 to be positioned along the end 64A of the shutter blades 74 which prevents the tie bar 82 from distributing airflow into the housing 12. The tie bar pin 80 allows the shutter blades 64 to be connected to a tie bar 82 which allows the shutter blades 64 to move in unison and prevents fluttering of the shutter blades 64.

In the preferred embodiment, the shutter blades 64 have an airfoil shape. The airfoil shape allows the shutter blades 64 to lift or open as air moves past with minimum drag. The shape of the shutter blades 64 allows for less restriction or turbulence of the air flowing through the shutter assembly 60 and into the inner cavity 18 of the housing 12 and into the propeller 28 of the fan 22. The pivot pins 78 in the end pieces 70 at the ends 64A and 64B of the shutter blades 64 are positioned such that gravity acting on the shutter blades 64 assists in opening the shutter blades 64 and maintaining the shutter blades 64 in the open position such that less lift or air movement is required to hold the shutter blade 64 open. Therefore, the shutter blades 64 will open when the air is moving at a lower rate resulting in less drag or pressure loss and thus, allowing greater airflow. The weight of the tie bar 82 also assists in opening and maintaining the shutter blades 64 in an open position. The tie bars 82 for the shutter blades 64 are weighted to assist in moving the shutter blades 64 into a nearly 90° or horizontal position as air moves through the shutter blades 64. Although a nearly 90° angle is optimal, in the preferred embodiment, the shutter blades 64 are considered fully open at an angle greater than 75°. When the shutter blades 64 are fully open, little energy is absorbed or used to keep the shutter blades 64 in the fully open position. Any loss is minimal. The shutter assembly 60 including the frame 62 and the shutter blades 64 is preferably constructed of PVC.

It is intended that the foregoing description by only illustrative of the present invention and that the present invention be limited only by the hereinafter appended claims.

We claim:

1. A fan assembly for use in ventilation of a building, which comprises:
   (a) a housing having an outlet and an inlet with an inner cavity extending between the inlet and the outlet;
   (b) a motor mounted in the inner cavity of the housing spaced between the inlet and the outlet;
   (c) a center hub with a first end and a second end mounted in the inner cavity such that the first end is facing the outlet of the housing and the second end is facing the inlet of the housing and connected to the motor; and
   (d) blades having opposed ends with a leading edge and a trailing edge extending between the ends and mounted at one end on the center hub such that the trailing edge is adjacent the first end of the hub and the leading edge is adjacent the second end of the hub wherein the trailing edge of the blades has a rounded protrusion spaced apart from the end of the blade mounted on the center hub.

2. The fan assembly of claim 1 wherein a width of the blades between the edges adjacent the one end of the blades mounted on the center hub is less than a width of the blades between the edges adjacent the opposed end of the blades.

3. The fan assembly of claim 1 wherein the blades have an airfoil shape.

4. The fan assembly of claim 1 wherein the blades have a swept back tip on the trailing edge adjacent the end of the blades opposite the center hub.

5. The fan assembly of claim 1 wherein there are three blades, wherein a width of the blades between the leading edge and the trailing edge adjacent the end of the blades mounted on the center hub is less than a width of the blades between the leading edge and the trailing edge adjacent the end of the blades opposed to the center hub, wherein the blades have a swept back tip on the trailing edge adjacent the second end of the blades and wherein the blades have an airfoil shape.

6. The fan assembly of claim 1 wherein each blade is configured such that when the blades rotate, the axial velocity of air coming off the blades is essentially constant along most of a length of the blades from the second end of the blades opposed to the center hub to the end of the blades adjacent the center hub.

7. The fan assembly of claim 1 wherein the blades and center hub form a propeller and wherein a length of the blades is such that a distance between the housing and the end of each blade opposed to the center hub is between 0.4% and 0.8% of a diameter of the propeller.

8. The fan assembly of claim 1 wherein the inlet of the housing has a square cross-section.

9. The fan assembly of claim 1 wherein the housing has a center portion, wherein a shoulder is formed in the inner cavity of the housing at an intersection of the inlet and the center portion and wherein the shoulder is rounded such as to reduce disruption of air entering the center portion from the inlet.

10. The fan assembly of claim 1 wherein the housing has a center portion, wherein a bracket is mounted adjacent the center portion, wherein the motor is mounted on the bracket and wherein the center hub is connected to the motor such that the blades are completely within the center portion of the inner cavity.

11. The fan assembly of claim 10 wherein the bracket includes a first and second arm which extend across the inner cavity of the housing, wherein the motor has a shaft and wherein the motor is mounted on the bracket such that the shaft of the motor is co-axial with an axial center of the center portion of the inner cavity.

12. The fan assembly of claim 11 wherein the first and second arms have opposed ends with a front side extending between the ends, wherein the arms are mounted in the inner cavity such that the front side is facing the inlet of the housing and wherein the front side of the first and second arms of the bracket is radiused to reduce disruption of air entering the center portion from the inlet.

13. The fan assembly of claim 12 wherein the first and second arms of the bracket each include opposed end sections with a center section spaced therebetween wherein the end sections extend outward from the center section such that when the bracket is mounted in the inner cavity, planes formed by the arms extend through and intersect at the axial center of the center portion of the inner cavity.

14. The fan assembly of claim 1 wherein the housing has a center portion spaced between the inlet and the outlet, wherein an inner side of the housing has grooves between the center portion of the housing and the outlet of the housing.

15. The fan assembly of claim 14 wherein the outlet of the housing includes a discharge cone having a conical shape and wherein the grooves are provided around the discharge cone.

16. The fan assembly of claim 1 wherein a backdraft assembly is mounted at the inlet of the housing, wherein the backdraft assembly includes a frame with shutter blades pivotably mounted on the frame, wherein the shutter blades have an airfoil shape with a leading edge and a trailing edge and are mounted at the leading edge to the frame and wherein a flexible flap is mounted on the trailing edge such that when the shutter blades are in a closed position, the flexible flap of one shutter blade contacts a next adjacent shutter blade for sealing the backdraft assembly to prevent air in the inner cavity of the housing from moving out of the housing through the inlet and the backdraft assembly and wherein a side of the frame opposite the inlet is radiused to reduce disruption of air entering the fan assembly.

17. The fan assembly of claim 16 wherein the backdraft assembly is removable and wherein the inner cavity of the housing adjacent the inlet is provided with toggle latches which engage a strike mounted on the frame of the backdraft assembly to secure the backdraft assembly on the inlet.

18. The fan assembly of claim 16 wherein the frame of the backdraft assembly has radiused edges on an outside surface opposite the inlet of the housing to reduce disruption of air entering the housing.

19. A fan assembly for use in ventilation of a building, which comprises:
(a) a housing having an outlet and an inlet with an inner cavity extending between the inlet and the outlet;
(b) a motor mounted in the inner cavity of the housing spaced between the inlet and the outlet;
(c) a center hub with a first end and a second end mounted in the inner cavity such that the first end is facing the outlet of the housing and the second end is facing the inlet of the housing and connected to the motor; and
(d) blades having opposed ends with a leading edge and a trailing edge extending between the ends and mounted at one end on the center hub such that the trailing edge is adjacent the first end of the hub and the leading edge is adjacent the second end of the hub wherein the trailing edge of the blades adjacent the one end of the blade mounted on the center hub has a rounded protrusion and wherein a width of the blades between the edges adjacent the center hub is less than a width of the blades between the edges adjacent the opposed end opposed to the center hub.

20. A fan assembly for use in ventilation of a building, which comprises:
(a) a housing having an outlet and an inlet with an inner cavity extending between the inlet and the outlet;
(b) a motor mounted in the inner cavity of the housing spaced between the inlet and the outlet;
(c) a center hub with a first end and a second end mounted in the inner cavity such that the first end is facing the outlet of the housing and the second end is facing the inlet of the housing and connected to the motor; and
(d) blades having opposed ends with a leading edge and a trailing edge extending between the ends and mounted at one end on the center hub such that the trailing edge is adjacent the first end of the hub and the leading edge is adjacent the second end of the hub wherein the trailing edge of the blades adjacent the one end of the blade mounted on the center hub has a rounded protrusion and wherein the rounded protrusion of the blades does not extend inward toward the hub.

21. A fan assembly for use in ventilation of a building, which comprises:
(a) a housing having an outlet and an inlet with an inner cavity extending between the inlet and the outlet;
(b) a motor mounted in the inner cavity of the housing spaced between the inlet and the center portion;
(c) a center hub with a first end and a second end mounted in the inner cavity such that the first end is facing the outlet of the housing and the second end is facing the inlet of the housing and connected to the motor; and
(d) blades having opposed ends with a leading edge and a trailing edge extending between the ends and mounted at one end on the center hub such that the trailing edge is adjacent the first end of the hub and the leading edge is adjacent the second end of the hub wherein the trailing edge of the blades adjacent the one end of the blade mounted on the center hub has a rounded protrusion and wherein the leading edge of the blades does not extend beyond the first end of the hub toward the outlet of the housing.

\* \* \* \* \*